United States Patent
Szalajski et al.

(10) Patent No.: US 6,275,487 B1
(45) Date of Patent: Aug. 14, 2001

(54) BCCH CARRIER OF NON-CONSTANT POWER AND CORRESPONDING METHOD OF MEASURING THE SIGNAL LEVEL RECEIVED BY A MOBILE STATION ON A CARRIER OF THIS KIND

(75) Inventors: David Szalajski, Versailles; Evelyne Le Strat, Paris, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/114,567

(22) Filed: Jul. 13, 1998

(30) Foreign Application Priority Data

Jul. 17, 1997 (FR) .................................................... 97 09069

(51) Int. Cl.⁷ .............................. H04B 7/212; H04B 7/00; H04B 7/20; H04Q 7/20
(52) U.S. Cl. ........................... 370/347; 455/515; 455/434
(58) Field of Search .................................... 370/328, 329, 370/330, 336, 337, 345, 347, 348, 349, 350, 478, 498, 503, 509, 522, 524; 455/515, 434, 115, 67.1

(56) References Cited

U.S. PATENT DOCUMENTS 5,933,418 * 8/1999 Massingill et al. .................. 370/321
5,940,380 * 8/1999 Poon et al. ............................ 370/330

FOREIGN PATENT DOCUMENTS

WO 92/16059 9/1992 (WO) .
WO 95/33313 12/1995 (WO) .
WO 96/09725 3/1996 (WO) .

* cited by examiner

*Primary Examiner*—Huy D. Vu
*Assistant Examiner*—Kevin C. Harper
(74) *Attorney, Agent, or Firm*—Sughrue, Mion, Zinn, Macpeak & Seas, PLLC

(57) ABSTRACT

The invention concerns a BCCH carrier transmitted by a base station of a digital cellular mobile radio system. The BCCH carrier is segmented temporally into frames each divided into a particular number $N_{IT}$ of time slots. The BCCH carrier supports a physical BCCH itself carrying at least one logical BCCH transmitting BCCH information. Each mobile station, for which the base station transmitting said BCCH carrier is an adjoining base station, has at least one monitoring window in each of at least $N_T$ successive frames, where $N_T \geq 1$, i.e. at least $N_F$ successive monitoring windows each enabling the mobile station concerned to receive at least $N_E$ time slots of the BCCH carrier, where $N_E \geq 1$. The BCCH carrier supports at least $N_R$ physical BCCH transmitted at constant power and consisting in the recurrence in each frame of $N_R$ BCCH time slots. The or each of the $N_R$ physical BCCH carries at least the logical BCCH, each BCCH time slot containing the BCCH information at least once in $N_T$ successive frames. The number and the spacing of the $N_R$ BCCH time slot(s) are such that the BCCH information is entirely received in the monitoring window or one of the at least $N_F$ successive monitoring windows of each mobile station. The time slots other than the BCCH time slots are transmitted with a power that can be controlled.

14 Claims, 1 Drawing Sheet

BCCH CARRIER OF NON-CONSTANT POWER AND CORRESPONDING METHOD OF MEASURING THE SIGNAL LEVEL RECEIVED BY A MOBILE STATION ON A CARRIER OF THIS KIND

BACKGROUND OF THE INVENTION

1. Field of the Invention

The field of the invention is chat of digital cellular mobile radio systems such as those conforming to the GSM public land mobile radio network standard.

The expression "GSM standard" here means not only GSM standard 900 covering GSX mobile radio systems operating in the 900 MHz band but also the DCS 1800 standard covering systems operating in the 1800 MHz band.

To be more precise, the invention concerns a particular BCCH carrier structure and a method of measuring the signal level received by a mobile station on a BCCH carrier of this kind.

2. Description of the Prior Art

A digital cellular mobile radio system is generally implemented within a network of geographical cells through which mobile stations travel. A base station is associated with each cell and a mobile station communicates via the base station associated with the cell in which it is located.

Each base station (and therefore each cell) uses one or more pairs of radio carriers, necessarily including a pair of BCCH carriers specific to it The carriers of the same pair are respectively used for the uplink (mobile station to base station) and downlink (base station to mobile station) directions.

In the conventional way, each carrier is segmented temporally using a fixed time-division multiple access (TDMA) scheme. The time axis is divided into successive frames of fixed duration each divided into a particular number of time slots, the recurrence of a particular time slot in each frame constituting a physical channel onto which a plurality of logical channels can be multiplexed.

The uplink BCCH carrier (transmitted by the mobile station) generally supports a logical traffic channel (TCH) which is used to transmit user data or speech and a logical random access channel (RACH) which a mobile station uses to access the network in order to log on in a cell or to make a call.

The downlink BCCH carrier (transmitted by the base station) supports one or more traffic channels multiplexed onto one or more physical channels and the following signaling channels, which are generally multiplexed onto a physical channel consisting of the recurring first time slot of each frame:

a logical broadcast control channel (BCCH) which supplies to all mobile stations general information on the network, the cell in which the mobile station is located and the adjacent cells, a logical synchronization channel (SCH) which carries information for synchronizing frames and identifying the base station transmitter, a logical frequency channel (FCH) which provides information on the carrier used, a logical access grant channel (AGCH) which is used to assign dedicated resources (signaling channel (SDCCH) or traffic channel) to the mobile station requesting them via the random access channel, and a logical paging channel (PCH) which is used to locate a mobile station and to advise it of a call from the network.

The present invention is specifically concerned with the downlink BCCH carrier which in the remainder of the description is simply referred to as the BCCH carrier.

An essential role of the BCCH carriers is to enable the system to determine the cell in which each mobile station is located so that it can detect when a mobile station moves from one cell to another. A mobile station in a given cell, known as the current cell, monitors the BCCH carriers of adjoining cells continuously and sends the corresponding measurements to the system so that it can determine if the mobile station is moving from one cell to another.

During a call, monitoring of adjoining cells by the mobile station enables the system to decide when handover must take place, i.e. when an adjoining cell must become the new current cell.

Similarly, on standby, monitoring of adjoining cells by the mobile station enables the system to detect a change of location area identity (LAI).

In the conventional way a mobile station monitors the BCCH carriers of adjoining cells by measuring the signal level (i.e. the power) received on each BCCH carrier. The adjoining cell whose identifier has been decoded and whose BCCH carrier is received with the maximal power is then chosen as the new current cell.

At present each base station transmits its BCCH carrier at constant power. It is generally accepted that all time slots of all frames of the same BCCH carrier must be transmitted with the same power. In other words, all physical channels (themselves carrying multiplexed logical channels, i.e. logical signaling channels and traffic channels) are transmitted with a maximum power.

Transmitting a BCCH carrier with a constant power has the major drawback of implying a high level of interference on the BCCH carrier. Consequently, re-use of BCCH carriers in the cells is low. In other words, it is difficult to use the same BCCH carrier again in other cells and the frequency band needed to assure a given traffic is therefore greater, which constitutes a non-negligible economic drawback.

Also, it is not possible to apply to a constant power BCCH carrier interference reduction techniques such as power control or discontinuous transmission (DTX).

An objective of the invention is to alleviate these various drawbacks of the prior art.

To be more precise, one objective of the present invention is to provide a BCCH carrier that can be transmitted at non-constant power, in particular to reduce the level of interference on the BCCH carrier and to increase re-use of BCCH carriers in the various cells.

Another objective of the invention is to provide a monitoring strategy suitable for a BCCH carrier of the above kind transmitted at non-constant power In other words, another objective of the invention is to provide a method of measuring the signal level received by a mobile station on a BCCH carrier of the above kind.

SUMMARY OF THE INVENTION

The above objectives, and others that will become apparent hereinafter, are achieved in accordance with the invention by means of a BCCH carrier transmitted by a base station of a digital cellular mobile radio system to a plurality of mobile stations, the BCCH carrier being segmented temporally into successive frames of fixed duration, each of the frames being itself divided into a particular number $N_{IT}$ of time slots; the BCCH carrier supporting a physical BCCH itself carrying at least one logical BCCH, the logical BCCH transmitting general signaling information known as BCCH information, each mobile station, for which the base station transmitting the BCCH carrier is an adjoining base station. having an least one monitoring window in each of at least $N_T$ successive frames, where $N_T \geq 1$, i.e. at leas. $N_F$ successive monitoring windows for receiving the BCCH carrier in particular, each monitoring window enabling the mobile station concerned to receive at least $N_E$ time slots of the BCCH carrier, where $N_E \geq 1$, wherein the BCCH carrier supports at least $N_R$ physical BCCH transmitted at constant power and consisting in the recurrence in each frame of $N_R$ time slots known as BCCH time slots, the physical BCCH or each of the $N_R$ physical BCCH carries at least the logical BCCH, the BCCH time slot or each of the $N_R$ BCCH time slots containing the BCCH information at least once in $N_T$ successive frames, the number and the spacing of the BCCH time slot or time slots are such that the BCCH information is entirely received in the monitoring window or one of the at least $N_p$ successive monitoring windows of each mobile station, and the time slots other than the $N_R$ BCCH time slots are transmitted with a power that can be controlled.

Thus the BCCH carrier of the invention is not transmitted at constant power, which reduces the level of interference on the BCCH carrier and increases re-use of the BCCH carrier in the various cells.

The general principle of the invention is to transmit at constant power only one or more time slots (called "BCCH time slots" in the remainder of the description), the recurrence of each of these BCCH time slots constituting a physical BCCH carrying the logical BCCH (possibly multiplexed with other logical signaling channels or traffic channels).

The only rule to be complied with is that the number and the spacing of the BCCH time slots must be such that at least one of the BCCH time slots is entirely received within one of the at least NF successive monitoring windows of each mobile station. In other words, the mobile station, which has at least $N_F$ successive adjoining cell monitoring windows (between sending and receiving the traffic channel), must receive at least one of the BCCH time slots of the BCCH carrier.

Each time slot (and therefore each corresponding physical channel) whose power can be controlled, i.e. other than one of the BCCH time slots, carries one or more multiplexed logical traffic channels used by mobile stations whose current cell is that associated with the BCCH carrier concerned. Controlling the power of each of these physical channels is principally intended to use only the minimal power necessary for correct handling of traffic. Obviously this minimal necessary power is directly dependent on the position of the mobile station concerned relative to the base station of its current cell. Accordingly, the physical channel that carries a logical traffic channel of a mobile station near its current base station requires much less power than that carrying a logical traffic channel of a mobile station at the cell boundary.

The number $N_R$ of BCCH time slots advantageously satisfies the following condition: $N_R = INT [N_{IT}/N_E]$, where INT [X] is the integer greater than or equal to X.

When $N_R \geq 2$, the $N_R$ BCCH time slots are advantageously equally distributed within the frame structure.

When $N_T \geq 2$, the physical BCCH or at least one of the $N_R$ physical BCCH preferably carries, in addition to the logical BCCH, at least one other logical channel multiplexed with the logical BCCH on the physical BCCH, the at least one other logical channel transmitting other information in the BCCH time slot or each of the $N_R$ BCCH time slots that does not contain the BCCH information.

This avoids loss of the capacity left free on each physical BCCH because the logical BCCH is not present in each frame Some BCCH time slots do not contain BCCH information.

The at least one other logical channel multiplexed with the logical BCCH on the physical BCCH is preferably selected from the group comprising:
a half-rate traffic channel,
a slow dedicated control channel,
a synchronization channel,
a frequency channel,
an access grant channel, and
a paging channel.

When $N_T > 2$ and $N_R \geq 2$, at least one of the $N_R$ BCCH time slots advantageously contains the BCCH information in each successive frame, and the or the other the $N_R$ BCCH time slots contain either the BCCH information or the other information, depending on the frame.

Accordingly, the concept of the invention can be extended to the situation in which the BCCH information appears.
on the one hand, always at the same time slot position (the first time slot in each frame, for example, as in the GSM standard) and with a particular timing, and
on the other hand, at different time slot positions depending on the frame (it is then as if the logical BCCH appeared to slip. between BCCH time slots,. i.e. between different physical BCCH, from one frame to another.

The invention also concerns a method of measuring the signal level received on a BCCH carrier as defined above by a mobile station for which the base station transmitting the BCCH carrier is an adjoining base station, the mobile station having at least one monitoring window in each of at least $N_T$ successive frames, where $N_T \geq 1$, i.e. at least $N_F$ successive monitoring windows for receiving the BCCH carrier in particular, each monitoring window enabling the mobile station to receive at least $N_E$ time slots of the BCCH carrier, where $N_E \geq 1$, the method comprising the following steps:
dividing the monitoring window or each of the $N_F$ successive monitoring window(s) into a plurality of time portions so that, on receiving the BCCH carrier, at least one of the time portions contains only a part of the BCCH time slot or one of the $N_R$ BCCH time slots,
measuring the received signal level in each time portion of each of the $N_F$ successive monitoring windows, and
comparing the measured received signal levels in order to detect the maximal received signal level, which is deemed to constitute the signal level received on the BCCH carrier.

Other features and advantages of the invention will become apparent upon reading the following description of a preferred embodiment of the invention given by way of non-limiting and illustrative example and from the accompanying drawings.

BRIEF DESCRIPTION OF THE DRAWINGS

Each of FIGS. 1 to 3 shows one or more successive frames of a particular embodiment of a BCCH carrier in accordance with the invention and one or more corresponding successive monitoring windows available to each mobile station for which this BCCH carrier constitutes a neighboring cell BCCH carrier (i.e a monitoring window in one frame in FIG. 1, two monitoring windows in two frames in FIG. 2 and three monitoring windows in three frames in FIG. 3).

DETAILED DESCRIPTION OF THE PREFERRED EMBODIMENTS

Thus the invention concerns a particular BCCH carrier structure and a method of measuring the signal level received by a mobile station on a BCCH carrier of this kind.

A BCCH carrier is transmitted by a base station of a digital cellular mobile radio system. It is specific to the geographical cell associated with that base station. It supports as many physical channels as there are time slots in each frame. In particular it supports a physical BCCH carrying a logical BCCH which transmits general signaling information (BCCH information).

Mobile stations move between the various geographical cells. For a given mobile station, the "current cell" is the cell in which that mobile station is located and an "adjoining cell" is a cell adjoining the current cell. The expressions "current base station" and "adjoining base stations" are also used, according to whether the cell with which the base station concerned is associated is the current cell or an adjoining cell, respectively.

Figure 1:
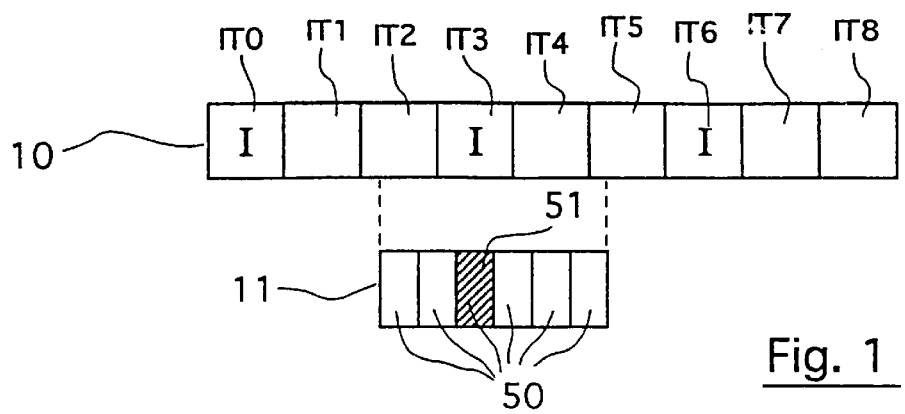

FIG. 1 shows a frame structure 10 of a first particular embodiment of a BCCH carrier in accordance with the invention. In the conventional way the frame 10 is divided into a particular number of time slots IT0 to IT8 ($N_{IT}$=9 in the example shown).

FIG. 1 also shows a window 11 for monitoring of the BCCH carrier by a mobile station, this BCCH carrier constituting for this mobile station an adjoining cell BCCH carrier. For simplicity, in the remainder of the description the expression "the mobile station" designates a mobile station of this kind.

The mobile station generally has at least one monitoring window in each of at least $N_T$ successive frames.

In the example shown in FIG. 1 the mobile station has a monitoring window 11 for the BCCH carrier in only one frame (thus $N_T$=1). In other words, the mobile station does not have a monitoring window in the preceding and following frames.

The monitoring window 11 enables the mobile station to receive $N_E$ time slots of the BCCH carrier between sending and receiving the traffic channel or channels. In FIG. 1 $N_E$=3.

The monitoring window 11 is made up of $N_E$+1 time slots. Because the current base station (of the mobile station) and the adjoining base station (transmitting the BCCH carrier under discussion) are not synchronized they can be offset relative to each other by half the duration of a time slot at most. Consequently, it is not possible to assure the presence in the monitoring window 11 of only $N_E$ time slots of the BCCH carrier.

As shown in FIG. 1, in the first particular embodiment of a BCCH carrier of the invention, of the 9 ($N_{IT} \times N_T$=9×1) time slots of each frame of the BCCH carrier, a particular number ($N_R$=3) of time slots IT0, IT3, IT6 called BCCH time slots are transmitted with constant power. Remember that the recurrence of each BCCH time slot constitutes a physical BCCH.

Each BCCH time slot must contain the BCCH information at least once in $N_T$ successive frames. In this first embodiment $N_T$=1. Consequently, each BCCH time slot contains the BCCH information (denoted "I" in the figure), which means that each physical BCCH carries only the logical BCCH (there is no multiplexing of the logical BCCH with other logical channels).

The number and the spacing of $N_R$ BCCH time slots are such that at least one of them is received in full in the single monitoring window 11. In this example, the fourth BCCH time slot IT3 is entirely received in monitoring window 11.

The time slots IT1, IT2, IT4, IT5, IT7, IT8 other than these $N_R$ BCCH time slots (IT0, IT3, IT6) are transmitted with a power that can be controlled. These other time slots support logical traffic channels.

The number $N_R$ of BCC,Q time slots is calculated using the following equation, for example: $N_R$=INT [$N_{IT}/N_E$], wherein INT [X] is the integer greater than or equal to X. Thus in the FIG. 1 example: $N_R$=INT [9/3]=3.

Figure 2:
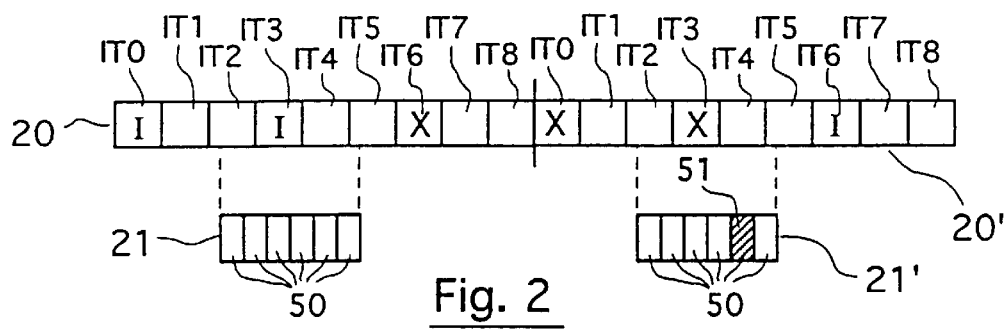

The $N_R$ BCCH time slots are equally divided between the $N_{IT}$ possible time slot positions in the frame structure 10 of the BCCH carrier. In the FIG. 1 example the three BCCH time slots IT0, IT3, IT6 occupy the first, fourth and seventh time slot positions FIG. 2 shows two successive frames 20, 20' of a second particular embodiment of a BCCH carrier in accordance with the invention. As previously, each frame 20, 20' is divided into a particular number of time slots IT0 through IT8, IT0' through IT8' ($N_{IT}$=9).

FIG. 2 also shows two successive monitoring windows 21, 21' for monitoring of the BCCH carrier by a mobile station. The mobile station in this example has one window 21, 21' for monitoring the BCCH carrier in two successive frames (thus $N_T$=2). Each monitoring window 21, 21' enables the mobile station to receive $N_E$ (=3) time slots of the BCCH carrier.

As in the first embodiment, $N_R$=INT[$N_{IT}/N_E$]=3. In other words, there are three BCCH time slots (IT0, IT3, IT6) in each frame.

On the other hand, in this second embodiment, not all the BCCH time slots of each frame contain the BCCH information (I). In the first frame 20, only two of the three BCCH time slots (the first time slot IT0 and the fourth time slot IT3) contain the BCCH information and in the second frame 20' only one of the three BCCH time slots (the seventh time slot IT6) contains the BCCH information, It is sufficient to assure that at least one of the windows 20, 21' receives all of the BCCH information. In the FIG. 2 example it is the second monitoring window 21' which receives all of the BCCH information contained in the seventh time slot IT6 of the second frame 20'.

To optimize the use of the BCCH time slots, on each of the physical BCCH, the logical BCCH (which carries the BCCH information I) can be multiplexed with one or more other logical channels (each carrying other information X). Thus each BCCH time slot that does not contain the BCCH information is not empty but contains other information X.

The other logical channel or channels multiplexed with the logical BCCH are, for example, a half-rate TCH and/or an SDCCH and/or a synchronization channel (SCH) and/or a frequency channel (FCH) and/or an access grant channel (AGCH) and/or a paging channel (PCH)

Figure 3:
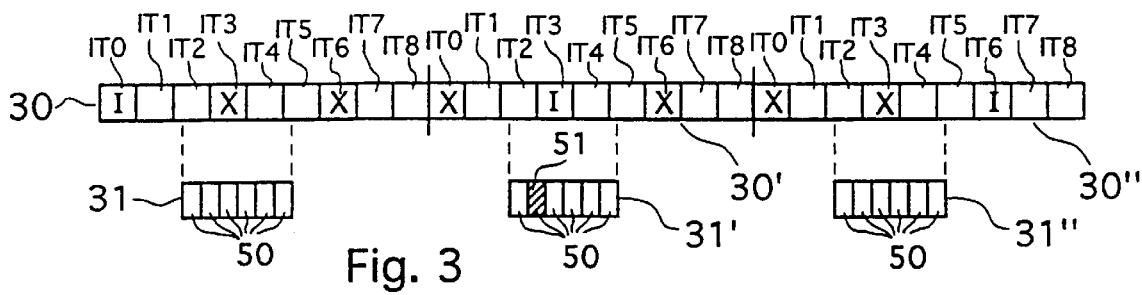

FIG. 3 shows three successive frames 30, 30', 30" of a third particular Embodiment of a BCCH carrier in accordance with the invention. As previously each frame 30, 30', 30" is divided into a particular number of time slots IT0 through IT8, IT0' through IT8', IT0" through IT8" ($N_{IT}$=9).

FIG. 3 also shows three successive monitoring windows 31, 31', 31" in which a mobile station monitors the BCCH carrier. In this example the mobile station has a window 31, 31', 31" for monitoring the BCCH carrier in three successive frames (thus $N_T$=3). Each monitoring window 31, 31', 31" enables the mobile station to receive $N_E$ (=3) time slots of the BCCH carrier.

As in the first embodiment, $N_R$=INT $[N_{IT}/N_E]$=3. In other words, there are three BCCH time slots (IT0, IT3, IT6) in each frame.

As in the second embodiment not all the BCCH time slots of each frame contain the BCCH information (I). In each frame 30, 30', 30", only one of the three BCCH time slots contains the BCCH information. In this third embodiment, which corresponds to the particular case in which $N_R=N_T$, it is as if the logical BCCH appeared to jump from one frame to the other on each of the physical BCCH (i.e. on each of the BCCH time slots).

In the FIG. 3 example it is the second monitoring window 31' which receives all of the BCCH information contained in the fourth time slot IT3 of the second frame 30'.

In a variant of the invention one or more BCCH time slots (for example the first time slot IT0 of each frame) always contains the BCCH information, regardless of the frame. The other BCCH time slots contain either the BCCH information or the information X of another logical channel, depending on the frame concerned.

In this case, the BCCH information appears with a particular timing in a fixed BCCH time slot (for example IT0) and moreover appears to slip in the other BCCH time slots. The mobile channels use the "fixed part" to synchronize, for example, and the "slipping part" is used by mobile stations preparing for handover and interested only in measuring the power level.

By generalizing this variant, the logical BCCH can be multiplexed with another logical channel in the "fixed part". This solution is perfectly suited to the logical SCH whose detection is equivalent in the GSM system to knowing the location of the first time slot It is therefore preferable to place the logical SCH in the "fixed party", since otherwise (ie. if it were placed in the "slipping part") further information would be needed, namely the time slot number.

The invention also concerns a method of measuring the signal level received on a BCCH carrier as described hereinafter.

Figure 4:
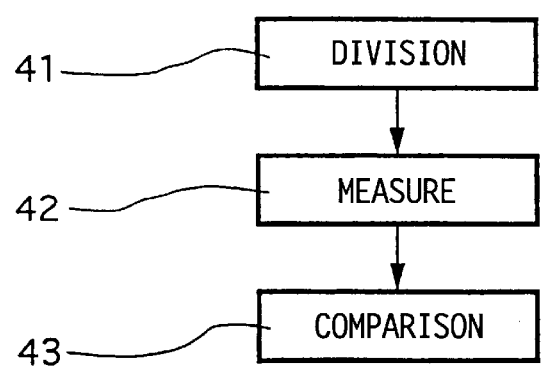
FIG. 4 shows a simplified flowchart of a particular embodiment of the method of the invention for measuring the signal level received on a BCCH carrier as shown in FIGS. 1 to 3.

As shown in the simplified flowchart of FIG. 4, in one particular embodiment, this method in accordance with the invention comprises the following steps:

step 41: dividing each successive monitoring window 11, 21, 21', 31, 31', 31" into a plurality of time portions 50 so that, on receiving the BCCH carrier, at least one of the time portions 50 contains only a part of one of the $N_R$ BCCH time slots, step 42: measuring the received signal level in each time portion 50 of each of the $N_F$ successive monitoring windows, and step 43: comparing the measured received signal levels in order to detect the maximal received signal level, this maximal received signal level being deemed to constitute a direct measurement of the signal level received on the BCCH carrier.

The time portion 51 in which the measured received signal level is maximal is shown shaded in each of FIGS. 1 to 3.

In the division step 41, the duration of each time portion 50 is limited to half the duration of a time slot of a BCCH carrier frame.

There is claimed:

1. A BCCH carrier transmitted by a base station of a digital cellular mobile radio system to a plurality of mobile stations, said BCCH carrier being segmented temporally into successive frames of fixed duration, each of said frames being itself divided into a particular number $N_{IT}$ of time slots, said BCCH carrier supporting a physical BCCH itself carrying at least one logical BCCH, said logical BCCH transmitting general signaling information known as BCCH information, each mobile station, for which the base station transmitting said BCCH carrier is an adjoining base station, having at least one monitoring window in each of at least $N_T$ successive frames, where $N_T \geq 1$ such as at least $N_F$ successive monitoring windows for receiving said BCCH carrier in particular, each monitoring window enabling the mobile station concerned to receive at least $N_E$ time slots of said BCCH carrier, where $N_E \geq 1$, wherein said BCCH carrier supports at least $N_R$ physical BCCH transmitted at constant power and consisting in the recurrence in each frame of $N_R$ time slots known as BCCH time slots said physical BCCH or each of said $N_R$ physical BCCH carries at least said logical BCCH, said BCCH time slot or each of said $N_R$ BCCH time slots containing said BCCH information at least once in $N_T$ successive frames, the number and the spacing of said $N_R$ BCCH time slot or time slots are such that said BCCH information is entirely received in said monitoring window or one of said at least $N_F$ successive monitoring windows of each mobile station, and time slots other than said $N_R$ BCCH time slots are transmitted with a power that can be controlled.

2. The BCCH carrier claimed in claim 1 wherein $N_R$=INT $[N_{IT}/N_E]$, where INT [X] is the integer greater than or equal to X.

3. The BCCH carrier claimed in claim 1 wherein, when $N_R \geq 2$, said $N_R$ BCCH time slots are equally divided within the frame structure.

4. The BCCH carrier claimed in claim 1 wherein, when $N_T \geq 2$, said physical BCCH or at least one of said $N_R$ physical BCCH carries, in addition to said logical BCCH, at least one other logical channel multiplexed with said logical BCCH on said physical BCCH, said at least one other logical channel transmitting other information in said BCCH time slot or each of said $N_R$ BCCH time slots that does not contain said BCCH information.

5. The BCCH carrier claimed in claim 4 wherein said at least one other logical channel multiplexed with said logical BCCH on said physical BCCH is selected from the group comprising:

a half-rate traffic channel, a slow dedicated control channel, a synchronization channel, a frequency channel, an access grant channel, and a paging channel.

6. The BCCH carrier claimed in claim 4 wherein, when $N_T \geq 2$ and $N_R \geq 2$, at least one of said $N_R$ BCCH time slots contains said BCCH information in each successive frame, and said other $N_R$ BCCH time slot or time slots contain(s) either said BCCH information or said other information, depending on the frame.

7. A method of measuring the signal level received on a BCCH carrier as claimed in claim 1 by a mobile station for which the base station transmitting said BCCH carrier is an adjoining base station, said mobile station having at least one monitoring window in each of at least $N_T$ successive frames, where $N_T \geq 1$, i.e. at least $N_F$ successive monitoring windows for receiving said BCCH carrier in particular, each monitoring window enabling said mobile station to receive at least $N_E$ time slots of said BCCH carrier, where $N_E \geq 1$, which method comprises the following steps:

dividing said monitoring window or each of said $N_F$ successive monitoring window(s) into a plurality of time portions so that, on receiving said BCCH carrier, at least one of said time portions contains only a part of said BCCH time slot or one of said $N_R$ BCCH time slots, measuring the received signal level in each time portion of each of said $N_F$ successive monitoring windows, and comparing the measured received signal levels in order to detect the maximal received signal level, which is deemed to constitute said signal level received on said BCCH carrier.

8. A BCCH carrier transmitted by a base station of a digital cellular mobile radio system to a plurality of mobile stations, said BCCH carrier being segmented temporally into successive frames of fixed duration, each of said frames being divided into a particular number $N_{IT}$ of time slots, said BCCH carrier supporting a physical BCCH that carries at least one logical BCCH that transmits general signaling information known as BCCH information, each mobile station, for which the base station transmitting said BCCH carrier is an adjoining base station, having at least one monitoring window in each of at least $N_T$ successive frames, where $N_T \geq 1$ such that at least $N_F$ successive monitoring windows for receiving said BCCH carrier, each monitoring window enabling the mobile station concerned to receive at least $N_E$ time slots of said BCCR carrier, where $N_F \geq 1$, wherein said BCCH carrier supports at least $N_R$ physical BCCH transmitted at constant power and consisting in the recurrence in each frame of $N_R$ time slots known as BCCH time slots, said physical BCCH or each of said $N_R$ physical BCCH carries at least said logical BCCH, said BCCH time slot or each of said $N_R$ BCCH time slots containing said BCCH information at least once in $N_T$ successive frames, the number and the spacing of said $N_R$ BCCH time slot or time slots are such that said BCCH information is entirely received in said monitoring window or one of said at least $N_F$ successive monitoring windows of each mobile station, and said time slots other than said $N_R$ BCCH time slots are transmitted with a power that can be controlled, wherein $N_R = \text{INT}[N_{IT}/N_E]$ and $\text{INT}[X]$ is the integer greater than or equal to X.

9. A BCCH carrier transmitted by a base station of a digital cellular mobile radio system to a plurality of mobile stations, said BCCH carrier being segmented temporally into successive frames of fixed duration, each of said frames being divided into a particular number $N_{IT}$ of time slots, said BCCH carrier supporting a physical BCCH that carries at least one logical BCCH that transmits general signaling information known as BCCH information, each mobile station, for which the base station transmitting said BCCH carrier is an adjoining base station, having at least one monitoring window in each of at least $N_T$ successive frames, where $N_T \geq 1$ such that at least $N_F$ successive monitoring windows for receiving said BCCH carrier, each monitoring window enabling the mobile station concerned to receive at least $N_E$ time slots of said BCCH carrier, where $N_E \geq 1$, wherein said BCCH carrier supports at least $N_R$ physical BCCH transmitted at constant power and consisting in the recurrence in each frame of $N_R$ time slots known as BCCH time slots, said physical BCCH or each of said $N_R$ physical BCCH carries at least said logical BCCH, said BCCH time slot or each of said $N_R$ BCCH time slots containing said BCCH information at least once in $N_T$ successive frames, the number and the spacing of said $N_R$ BCCH time slot or time slots are such that said BCCH information is entirely received in said monitoring window or one of said at least $N_F$ successive monitoring windows of each mobile station, and said time slots other than said $N_R$ BCCH time slots are transmitted with a power that can be controlled, wherein, when $N_R \geq 2$, said $N_R$ BCCH time slots are equally divided within the frame structure.

10. The BCCH carrier of claim 9, wherein when $N_T \geq 2$, said physical BCCH or at least one of said $N_R$ physical BCCH carries said logical BCCH and at least one other logical channel multiplexed with said logical BCCH on said physical BCCH, said at least one other logical channel transmitting other information in said BCCH time slot or each of said $N_R$ BCCH time slots that does not contain said BCCH information.

11. The BCCH carrier of claim 10, wherein said at least one other logical channel comprises one of:

a half-rate traffic channel;

a slow dedicated control channel;

a synchronization channel;

a frequency channel;

an access grant channel; and a paging channel.

12. The BCCH carrier of claim 10, wherein when $N_T \geq 2$ and $N_R \geq 2$, at least one of said $N_R$ BCCH time slots contains said BCCH information in each successive frame, and said other $N_R$ BCCH time slots contain one of said BCCH information or said other information in accordance with the frame.

13. A BCCH carrier transmitted by a base station of a digital cellular mobile radio system to a plurality of mobile stations, said BCCH carrier being segmented temporally into successive frames of fixed duration, each of said frames being divided into a particular number $N_{IT}$ of time slots, said BCCH carrier supporting a physical BCCH that carries at least one logical BCCH that transmits general signaling information known as BCCH information, each mobile station, for which the base station transmitting said BCCH carrier is an adjoining base station, having at least one monitoring window in each of at least $N_T$ successive frames, where $N_T \geq 1$ such that at least $N_F$ successive monitoring windows for receiving said BCCH carrier, each monitoring window enabling the mobile station concerned to receive at least $N_E$ time slots of said BCCR carrier, where $N_E \geq 1$, wherein said BCCH carrier supports at least $N_R$ physical BCCH transmitted at constant power and consisting in the recurrence in each frame of $N_R$ time slots known as BCCH time slots, said physical BCCH or each of said $N_R$ physical BCCH carries at least said logical BCCH, said BCCH time slot or each of said $N_R$ BCCH time slots containing said BCCH information at least once in $N_T$ successive frames, the number and the spacing of said $N_R$ BCCH time slot or time slots are such that said BCCH information is entirely received in said monitoring window or one of said at least $N_F$ successive monitoring windows of each mobile station, and time slots other than said $N_R$ BCCH time slots are transmitted with a power that can be controlled, wherein a method of measuring the signal level received on said BCCH carrier by said mobile station comprises:

dividing said monitoring window or each of said $N_F$ successive monitoring windows into a plurality of time portions so that, on receiving said BCCH carrier, at least one of said time portions contains only a part of said BCCH time slot, or one of said $N_R$ BCCH time slots, measuring the received signal level in each time portion of each of said $N_F$ successive monitoring windows, and comparing the measured received signal levels in order to detect the maximum received signal level, which constitutes said signal level received on said BCCH carrier.

14. The method of claim 13, said dividing step comprising forming said each of said plurality of time portions at one-half of a length of each of said time slots.

* * * * *